US008809604B2

(12) United States Patent
Yao et al.

(10) Patent No.: US 8,809,604 B2
(45) Date of Patent: *Aug. 19, 2014

(54) SUGAR ALCOHOL SPLIT INJECTION CONVERSION

(75) Inventors: Jianhua Yao, Bartlesville, OK (US); Edward L. Sughrue, II, Bartlesville, OK (US); Ronald E. Brown, Bartlesville, OK (US)

(73) Assignee: Phillips 66 Company, Houston, TX (US)

(*) Notice: Subject to any disclaimer, the term of this patent is extended or adjusted under 35 U.S.C. 154(b) by 1014 days.

This patent is subject to a terminal disclaimer.

(21) Appl. No.: 12/878,308

(22) Filed: Sep. 9, 2010

(65) Prior Publication Data

US 2011/0087060 A1    Apr. 14, 2011

Related U.S. Application Data

(60) Provisional application No. 61/250,633, filed on Oct. 12, 2009.

(51) Int. Cl.
    *C07C 1/00*   (2006.01)
(52) U.S. Cl.
    USPC ........... 585/240; 585/357; 585/733; 208/142; 568/386
(58) Field of Classification Search
    USPC ............... 585/240, 242, 733, 357, 469, 638; 44/605; 208/142; 568/386
    See application file for complete search history.

(56) References Cited

U.S. PATENT DOCUMENTS

| 5,705,722 | A | * | 1/1998 | Monnier et al. | 585/240 |
|---|---|---|---|---|---|
| 5,770,174 | A | | 6/1998 | Eller et al. | |
| 7,550,634 | B2 | * | 6/2009 | Yao et al. | 585/240 |
| 7,626,063 | B2 | * | 12/2009 | Ghonasgi et al. | 585/276 |
| 8,067,657 | B2 | * | 11/2011 | Duarte Santiago et al. | 585/733 |
| 8,231,804 | B2 | * | 7/2012 | Abhari | 252/73 |
| 2006/0186020 | A1 | * | 8/2006 | Gomes | 208/46 |
| 2007/0142633 | A1 | * | 6/2007 | Yao et al. | 536/124 |
| 2009/0166256 | A1 | * | 7/2009 | Lewis et al. | 208/89 |

FOREIGN PATENT DOCUMENTS

| GB | 2271575 | 4/2010 |
|---|---|---|
| WO | WO 2007125332 | * 11/2007 |

OTHER PUBLICATIONS

PCT/US10/48265 International Search Report (Form PCT/ISA/220) dated Sep. 9, 2009.
Davda, et al. "A review of catalytic issues and process conditions for renewable hydrogen and alkanes by aqueous-phase reforming of oxygenated hydrocarbons over supported metal catalysts", Applied Catalysis B: Environmental; 2005, vol. 56, pp. 171-186: p. 179, col. 2, para 1.
Wang, et al. "Liquefaction of corn stover using industrial biodiesel glycerol" Int. J. Agric & Biol Eng. Jun. 2009, vol. 2, No. 2, pp. 32-40, abstract.

* cited by examiner

*Primary Examiner* — Nina Bhat
(74) *Attorney, Agent, or Firm* — Phillips 66 Company

(57) ABSTRACT

A method of hydrotreating liquefied biomass feedstock with diesel feedstock to produce alkanes is demonstrated that prevents damage to the reactor catalyst, reduces coke production, and converts nearly all of the polyols to alkanes. In order to mitigate the potential coking issue and to moderate the temperature of the catalyst bed while maintaining high conversion for sugar alcohol to hydrocarbon via a hydrotreating process, a diesel feedstock is fed over the reactor catalyst with multiple injections of polyol feedstock along the reactor.

18 Claims, 2 Drawing Sheets

Hydrotreating Process for Sugar alcohols to Hydrocarbons

Note: Sugars never contact furnace tubes

Hydrotreating Process for Sugar alcohols to Hydrocarbons

Note: Sugars never contact furnace tubes

Reactor Configuration

SUGAR ALCOHOL SPLIT INJECTION CONVERSION

CROSS-REFERENCE TO RELATED APPLICATIONS

This application is a non-provisional application which claims benefit under 35 USC §119(e) to U.S. Provisional Application Ser. No. 61/250,633 filed Oct. 12, 2009, entitled "SUGAR ALCOHOL SPLIT INJECTION CONVERSION," which is incorporated herein in its entirety.

STATEMENT REGARDING FEDERALLY SPONSORED RESEARCH

None.

FIELD OF THE DISCLOSURE

The present disclosure generally relates to methods and apparatus for sugar alcohol split injection method to mitigate the potential coking issue and to moderate the temperature of the catalyst bed while maintaining high conversion for sugar alcohol to hydrocarbon via a hydrotreating process. In this method, the sugar alcohol stream is split to several streams and injected along the catalyst bed while diesel diluent is injected into the reactor at the top of the catalyst bed.

BACKGROUND OF THE DISCLOSURE

Processes to convert renewable resources into transportation fuels usually involve several steps. For example, one approach is to use acids to convert carbohydrates, starches, lignins, and other biomass into sugars such as glucose, lactose, fructose, sucrose, dextrose. The catalytic hydrogenation of the carbonyl groups of a sugar like glucose ($C_6H_{12}O_6$) can then produce a polyalcohol including sorbitol ($C_6H_{14}O_6$).

There has been a significant effort to produce alkanes through catalytic conversion of aqueous sorbitol and other bio-generated polyols. Chen and Koenig, U.S. Pat. No. 4,503,278, convert carbohydrates such as starch, cellulose and sugar on a crystalline silicate zeolite catalyst into fuels and useful chemicals by increasing hydrocarbon size. In U.S. Pat. No. 5,959,167, Shabtai and associates use lignins in a two-stage catalytic reaction process to produce a reformulated hydrocarbon gasoline product. In US2009126260, Aravanis, et al., convert terpenes from biomass through catalytic cracking to generate suitable fuel products. Gruter, EP2034005, prepares a hydroxymethylfurfural fuel additive from biomass by dehydration with an acid catalyst. In WO2008114033, Fredriksen and Myrstad, mix bio-oil and mineral oil in an FCC cracking unit to generate bio-LPG, bio-naphtha and alkylating or catalytically polymerizing bio-LPG fraction to form a bio-gasoline. Dumesic et al., U.S. Pat. No. 7,572,925, convert sugars to furan derivatives (e.g. 5-hydroxymethylfurfural, furfural, dimethylfuran, etc.) using a biphasic reactor containing a reactive aqueous phase and an organic extracting phase. Finally in US2008173570, Marchand and Bertoncini use hydrodesulphurization of an incoming stream that is subsequently cut with plant and/or animal oils, the oil mixture is hydrotreated with specialized equipment to effluents with higher cetane ratings. Unfortunately these systems do not address current problems encountered with processing biomass to automotive fuels.

Some advances have been made toward the catalytic conversion of sorbitol to alkanes. Huber, et al., (2004) used Palladium, Silica, and Alumina catalysts to convert sorbitol to a stream of alkanes including butane, pentane, and hexane. Incorporating hydrogenation of reaction intermediates with produced hydrogen increased yield. David, et al. (2004) assayed conditions for the production of hydrogen and/or alkanes from renewable feeds including aqueous solutions of sorbitol. In a review, Metzger (2006) notes alkane production from aqueous phase sorbitol reforming is improved with a bi-functional catalyst including a metal (Pt, Pd, or the like) and acid including silica alumina with the co-production of $H_2$ and $CO_2$. Although the yield of alkanes could be increased up to 98% when hydrogen was co-fed with the aqueous sorbitol stream they were able to reduce $CO_2$ production, increasing $H_2O$ production and pathway efficiency.

Previous methods are limited by size, temperature, products, and conversion rates. Unfortunately at higher temperatures and higher catalytic activity, these reactions become quickly fouled. The catalyst must be removed and replaced before sufficient volumes of fuel are processed. Thus, these reactions must be improved to meet a commercial production scale and cost effectiveness. The processes above do not remove oxygen, require expensive catalysts, are subject to fouling, and are not scalable to production levels required. Additionally, processing biomass as a common feedstock is hindered by short catalyst lifetime, increased pressures and temperatures, increased production of coke byproducts, and increased corrosiveness. These undesirable side-effects hinder mass production of renewable fuels from biomass. Although noble metals have been used for hydrotreating at lower temperatures, these expensive catalysts do not alleviate the problem of fouling and the reactions are difficult to perform on a commercial scale. A method of converting large quantities of biomass is required that does not damage catalysts and equipment during the refining process.

BRIEF DESCRIPTION OF THE DISCLOSURE

A method of hydrotreating liquefied biomass feedstock with diesel feedstock to produce alkanes is demonstrated that prevents damage to the reactor catalyst, reduces coke production, and converts nearly all of the polyols to alkanes. In order to mitigate the potential coking issue and to moderate the temperature of the catalyst bed while maintaining high conversion for sugar alcohol to hydrocarbon via a hydrotreating process, a diesel feedstock is fed over the reactor catalyst with multiple injections of polyol feedstock along the reactor.

Hydrotreating a mixture of sorbitol and diesel over a commercial hydrotreating catalyst produces lighter alkanes and hexanes desirable for gasoline fuels. Additionally, these methods can be modified to increase production of high octane methyl-cyclopentane (MCP) instead of n-hexane (HEX). Production of MCP dramatically increases the octane value of the product, thus commercial quantities of sorbitol are converted to hydrocarbons that can be blended directly into a valuable gasoline stream.

"Catalysts" as described herein are commercial grade hydrotreating catalysts used by petroleum industries in refining processes. Most metals catalyze hydrotreating including transition metals such as cobalt, molybdenum, nickel, titanium, tungsten, zinc, antimony, bismuth, cerium, vanadium, niobium, tantalum, chromium, manganese, rhenium, iron, cobalt, and the noble metals including platinum, iridium, palladium, osmium, rhodium and ruthenium (Chianelli, 2002) along with other metal compounds. Binary combinations of cobalt and molybdenum, nickel and molybdenum, and nickel and tungsten are also highly active. Commercial grade catalysts include Cobalt-Molybdenum (Co/Mo), Nickel-Molybdenum (Ni/Mo), Titanium-Molybdenum (Ti/

Mo), Nickel-Tungsten (Ni/W), Cobalt (Co), Molybdenum (Mo), Copper (Cu), Iron (Fe), combinations thereof and other commercially available hydrotreating catalysts. Noble metal catalysts, including Platinum (Pt), Palladium (Pd), and Ruthenium (Ru) catalysts may also be used. One of ordinary skill in the art may select a catalyst based on composition, structure and charge to achieve specific activity from the catalyst. Although selection of a catalyst and activity is highly predictable because the reaction is based on the surface structure of the catalyst, the rate of reaction and overall productivity may vary dependent upon the reactants, reaction conditions, and flow rate.

Commercial refining catalysts are readily available from a variety of sources including ALBEMARLE, ADVANCED REFINING TECHNOLOGIES (ART), AMERICAN ELEMENTS, EURECAT, FISCHER, HALDOR TOPSOE, HEADWATER, PGM CATALYSTS & CHEMICALS, SIGMA, and other chemical suppliers. Catalysts are supported on an alumina, silica, titania, zeolite, carbon or other support materials. Catalysts may be microsized, nanosized, fluidized or other catalyst forms dependent upon the reactor size, shape and conditions under which the reaction is run. The catalysts may also be unsupported including unsupported Co/Mo, Co/W, Ni/Mo, Ni/W, Ti/Mo, Ti/W, Co/Mo/W, Ni/Mo/W, Ti/Mo/W and the like are used for hydrotreating polyols to yield increased hexanes, pentanes, cyclopentanes and other higher octane products. In one embodiment a Co/Mo catalyst on alumina support is used in mixed bed reactors. In another embodiment, a Ni/Mo catalyst on a solid alumina support is used for continuous flow through reactions. Additionally, a Co/Mo catalyst on a zeolite support may be used. In a preferred embodiment, unsupported Ni/Mo, Co/Mo, or combinations of Ni/Mo and Co/Mo catalysts are used in a commercial refinery to process mixed polyols.

Fuel oil feedstocks include a variety of fuels including fuels in the diesel boiling range. Additionally other fuel feedstocks may be used for processing including jet fuel, kerosene, diesel fuel, heating oil, and fuel oils. Diesel fuels include petro-diesel, bio-diesel, synthetic diesel, blended diesel, and the like. Market price and availability are used to determine the fuel feedstock of choice. Typically the fuel with the lowest overall cost including direct cost, transportation, process modification, processing and any other costs that may be associated with the fuel oil feedstock.

Polyol feedstocks consist of one or more polyols in an aqueous solution. Polyols include glycerol, sorbitol, xylitol, and the like. Liquefaction of biomass typically produces feedstocks containing sorbitol and xylitol. Feedstocks may contain from about 50 to about 98% v/v polyol. In one embodiment a polyol feedstock contains approximately 30%, 35%, 40%, 45%, 50%, 55%, 60%, 65%, 70%, 75%, 80%, 85%, 90%, 95%, up to 98% sorbitol, xylitol and mixtures of sorbitol and xylitol. Although sorbitol feedstock comprises sorbitol and aqueous solution, additional polyols, oils, and sugars are present after liquefaction. Many isomers, polymers, and soluble sugars are present in the aqueous liquefaction fraction. Hydrotreating will convert many of these to valuable fuel products (Table 1).

TABLE 1

POLYOLS AND THEIR PRODUCTS.

| Polyol | Carbons | Oxygens | Product |
| --- | --- | --- | --- |
| Glycol | 2 | 2 | Ethane |
| Glycerol | 3 | 3 | Propane |
| Erythritol | 4 | 4 | Butane |
| Threitol | 4 | 4 | Butane |
| Arabitol | 5 | 5 | Pentane |
| Ribitol | 5 | 5 | Pentane |
| Xylitol | 5 | 5 | Pentane |
| Allitol | 6 | 6 | Hexane |
| Dulcitol | 6 | 6 | Hexane |
| Galactitol | 6 | 6 | Hexane |
| Iditol | 6 | 6 | Hexane |
| Mannitol | 6 | 6 | Hexane |
| Sorbitol | 6 | 6 | Hexane |
| Isomalt | 12 | 11 | Hexane |
| Lactitol | 12 | 11 | Hexane |
| Maltitol | 12 | 11 | Hexane |
| Trehalose | 12 | 11 | Hexane |

Light gasses include methane, ethane, butane, isobutane, propane, pentane and mixtures thereof. Light gases produced during hydrotreating may be processed into individual or mixed products such as methane, ethane, propane, butane, compressed natural gas (CNG), natural gas liquids (NGL), liquefied petroleum gas (LPG), liquefied natural gas (LNG), or transferred to reforming for hydrogen generation with biomass solids.

A hydrotreating reactor is described where the hydrotreating reactor has a hydrotreating catalyst; a diesel feedstock injector at the beginning of the reactor catalyst, a polyol feedstock injector at or near the beginning of the reactor catalyst, and one or more additional polyol feedstock injectors at intervals along the reactor catalyst.

A method of hydrotreating polyol feedstocks to alkanes is described where a diesel feedstock is injected on the hydrotreating catalyst at the beginning of the reactor catalyst, a polyol feedstock is injected on the hydrotreating catalyst at or near the beginning of the reactor catalyst, and one or more additional polyol feedstocks are injected on the hydrotreating catalyst at intervals along the reactor catalyst.

Biomass is hydrotreated by generating a liquefying biomass to generate a polyol feedstock, contacting a hydrotreating catalyst with a fuel oil feedstock at the beginning of the reactor catalyst, contacting the hydrotreating catalyst with the polyol feedstock at or near the beginning of the reactor catalyst, and contacting the hydrotreating catalyst with one or more additional polyol feedstocks at intervals along the reactor catalyst, thus generating alkanes.

Polyol feedstocks are typically mixtures of Glycol, Glycerol, Erythritol, Threitol, Arabitol, Ribitol, Xylitol, Allitol, Dulcitol, Galactitol, Iditol, Mannitol, Sorbitol, Isomalt, Lactitol, Maltitol, Trehalose, and other products of the liquefaction process.

Fuel oil feedstocks include gasoline, jet fuel, kerosene, heating oil, fuel oils, diesel fuel, petro-diesel, bio-diesel, synthetic diesel, blended diesel, and combinations thereof. The fuel oil feedstock may be heated to reaction temperature prior to contacting the hydrotreating catalyst.

Hydrotreating catalyst are commonly metallic catalysts including cobalt (Co), molybdenum (Mo), nickel (Ni), titanium (Ti), tungsten (W), zinc (Zn), antimony (Sb), bismuth (Bi), cerium (Ce), vanadium (V), niobium (Nb), tantalum (Ta), chromium (Cr), manganese (Mn), rhenium (Re), iron (Fe), platinum (Pt), iridium (Ir), palladium (Pd), osmium (Os), rhodium (Rh), and ruthenium (Ru). Hydrotreating catalysts are also available as bimetallic catalysts including Co/Mo, Co/W, Ni/Mo, Ni/W, Ti/Mo, or Ti/W. Unsupported catalysts are commercially available as Co/Mo, Co/W, Ni/Mo, Ni/W, Ti/Mo, Ti/W, Co/Mo/W, Ni/Mo/W, Ti/Mo/W. These catalysts may be used alone or in a variety of mixed bed reactors.

Approximate reaction temperatures range from about 400° F., 425° F., 450° F., 475° F., 500° F., 525° F., 550° F., 575° F., 600° F., 625° F., 650° F., 675° F., 700° F., 725° F., 750° F., 775° F., 800° F., 825° F., 850° F., 875° F., to 900° F. or greater. Reaction temperatures may vary across the reactor by up to 25° F.

The reaction pressures ranges from of 500, 550, 600, 650, 700, 750, 800, 850, 900, 950, 1000, 1050, 1100, 1150, 1200, 1250, 1500, 1750, 2000, 2250, 2500, 2750, to 3000 psig or greater.

BRIEF DESCRIPTION OF THE DRAWINGS

A more complete understanding of the present invention and benefits thereof may be acquired by referring to the follow description taken in conjunction with the accompanying drawings in which.

DETAILED DESCRIPTION OF EMBODIMENTS OF THE INVENTION

Figure 1:
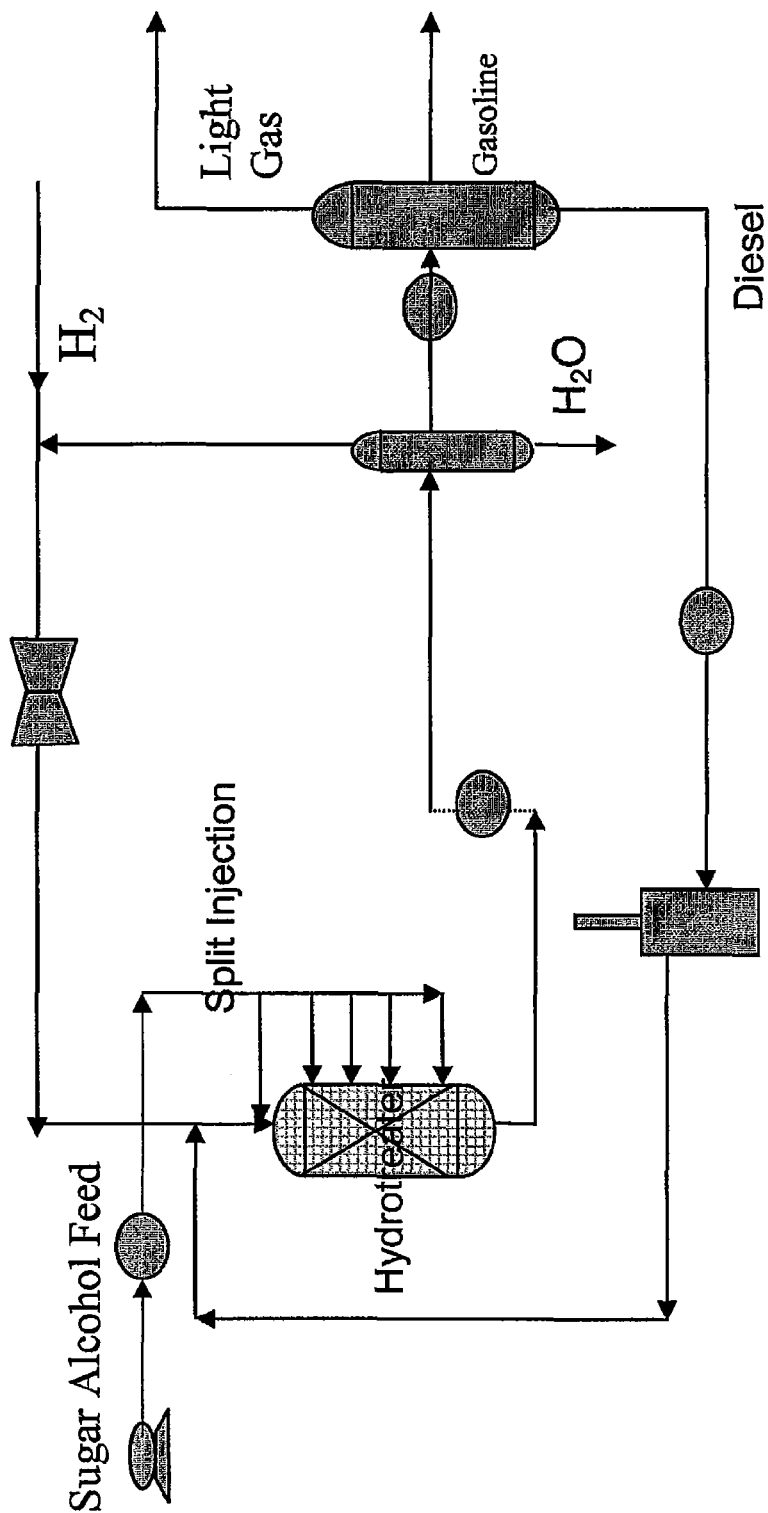
FIG. 1: Hydrotreating process for sugar alcohols to hydrocarbons.

Turning now to the detailed description of the preferred arrangement or arrangements of the present invention, it should be understood that the inventive features and concepts may be manifested in other arrangements and that the scope of the invention is not limited to the embodiments described or illustrated. The scope of the invention is intended only to be limited by the scope of the claims that follow. The present invention provides a method to increase the amount of polyol processed in a hydrotreating reactor by providing multiple polyol feedstock injectors along the reactor catalyst.

U.S. Provisional Application Ser. No. 61/236,347 filed Aug. 24, 2009, entitled "Hydrotreating Carbohydrates," which is incorporated herein in its entirety, describes a mixed sugar alcohol, diesel processing to convert biomass to liquid hydrocarbon fuels. Cellulose and hemicellulose are two major constituents in the biomass and can be broken down to C6 and C5 sugars using acid or enzyme hydrolysis processes. C6 and C5 sugars can be further hydrogenated to sugar alcohols using a commercial process. We have found that the sugar alcohols, such as sorbitol, can be hydrogenated to C6 hydrocarbons using a hydrotreating process. However, high coking rate is an issue for such process due to the nature of sugar alcohol molecule.

The following examples of certain embodiments of the invention are given. Each example is provided by way of explanation of the invention, one of many embodiments of the invention, and the following examples should not be read to limit, or define, the scope of the invention.

MATERIALS & METHODS

Sorbitol feedstock was processed in the presence of diesel feedstock at between 400-1000° F. and between about 150 to about 3000 psi. Sorbitol feedstock contains approximately 70% v/v sorbitol in aqueous solution. Sorbitol feedstock may range from about 50 to about 100% v/v sorbitol. A typical sorbitol solution often contains between 30 and 80% v/v sorbitol and many sorbitol solution are approximately 30% v/v, 35% v/v, 40% v/v, 45% v/v, 50% v/v, 55% v/v, 60% v/v, 65% v/v, 70% v/v, 75% v/v, 80% v/v, 85% v/v, 90% v/v, or 95% v/v sorbitol. Pure sorbitol may also be processed, but because of the hygroscopic nature it is usually found at less than 98% v/v sorbitol unless dried. Because the sorbitol feedstock is the product of a variety of reactions often derived from biomass the final sorbitol concentrations are quite variable and additional compounds may be found in a sorbitol feedstock.

Diesel feedstock is a commonly a mixture of diesel range hydrocarbon products. Diesel may also be supplied through a variety of sources either within or delivered to the refinery. In one aspect, diesel products remaining after processing are recycled to the gasoline fuel production. Sulfur present in some diesel feeds is used to maintain hydrotreating catalyst activity. Diesel feedstocks commonly contain between approximately 15 and 1500 ppm sulfur compounds. Sulfur content may get as high as 1% w/v for high sulfur diesels. For low sulfur diesels, the diesel feed is spiked with a very small amount of mercaptan or other sulfur compounds. In one embodiment the diesel feed is spiked with about 0.1 to about 1.0% w/v sulfur containing compound. In another embodiment the diesel feed is spiked with about 0.25 to about 0.5% w/v sulfur containing compound. In one embodiment the sulfur content is raised to above 1000 ppm.

A variety of sulfur compositions may be used to increase sulfur content of the diesel feedstock. Examples of sulfur compounds include, but are not limited to, hydrogen sulfide, carbonyl sulfide (COS), carbon disulfide ($CS_2$), mercaptans (RSH), organic sulfides (R—S—R), organic disulfides (R—S—S—R), thiophene, substituted thiophenes, organic trisulfides, organic tetrasulfides, organic polysulfides, benzothiophene, alkyl thiophenes, dibenzothiophene, alkyl benzothiophenes, alkyl dibenzothiophenes, and the like, and mixtures thereof as well as heavier molecular weights of the same, wherein each R can be an alkyl, cycloalkyl, or aryl group containing 1 to about 10 carbon atoms. These include mercaptan, dimethyl sulfide, hydrogen sulfide, dimethyl polysulfides, mercaptoethanol, mercaptobutanol, 2-mercaptoethyl sulfide, mercaptopropanol, 3-mercapto-2 methyl propanol, mercaptopentanol, thioglycerine, dithiothreitol, and other sulfur compositions may be used. Typically a sulfur composition is selected based on cost, quantity, availability, and chemical properties. In most cases a more soluble sulfur compound is selected that makes sulfur available for catalytic activity. In some cases a less soluble compound is used to maintain active sulfur compounds over a longer period of time, for greater volumes, or under varying reaction conditions.

EXAMPLE 1

Catalyst Bed Injection

Figure 2:
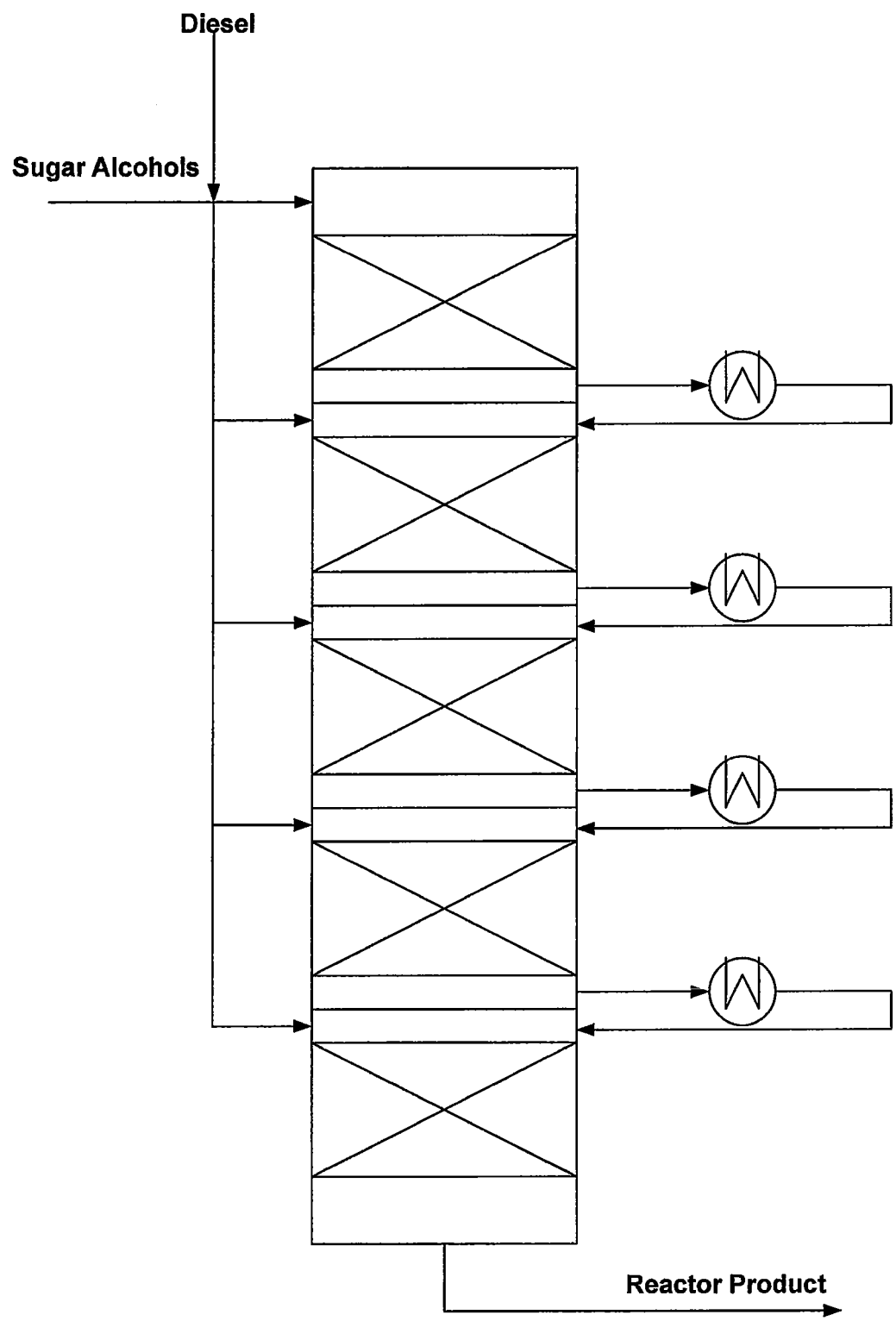
FIG. 2: Reactor configuration.

Experimental results, see U.S. Provisional Application 61/236,347 which is incorporated herein in its entirety, suggested that hydrocarbon dilution including using diesel as a diluent reduces the sugar alcohol coking tendency (Table 3, determined based on the reactor pressure drop) while the increasing of the diesel to sugar alcohol ratio had very little impact on sugar alcohol conversion and product distribution (Table 2). In addition, it is observed that the majority of sorbitol to hydrocarbon conversion reaction is taking place at the top part of the catalyst bed. The sugar alcohol hydrotreating unit is operated by splitting sugar alcohol injection along the catalyst bed. By doing so, it keeps the high diesel to sorbitol dilution along the entire length of the catalyst bed while reducing the circulation of the diesel diluent. In addition, this will moderates the temperature of the bed for this highly exothermic reaction by 1) dilution of the diesel feed, and 2) by taking the product exiting the reactor beds to an external cooling source such as a heat exchanger before it is returned back to the reactor. A schematic of the reactor configuration is shown below in FIG. 2.

TABLE 2

EFFECT OF DIESEL TO SORBITOL RATIO ON SORBITOL CONVERSION

| | Diesel/Sorbitol ratio (vol) | | |
|---|---|---|---|
| | 2 | 3 | 4 |
| Sorbitol Conversion | 99.8 | 99.7 | 99.4 |
| Product Selectivity (C mol %) | | | |
| C1-C4 | 30.8 | 27.5 | 26.7 |
| C5+ | 66.9 | 70.5 | 71.3 |
| CO/CO$_2$ | 2.3 | 1.9 | 2.0 |

The polyol feedstock injectors may be distributed at a variety of intervals, either uniform in length or designed to increase or decrease polyol concentrations over the length of the hydrotreating reactor. In one embodiment the polyol feedstock injectors are distributed evenly over the entire length of the reactor. The injectors may also distributed around the reactor to keep polyol concentrations uniform throughout the entire reaction. In another embodiment polyol feedstock injectors are distributed down the hydrotreating reactor with increasing frequency, thus increasing polyol feedstock concentration down the length of the reactor. By increasing the polyol concentration along the reactor, the reaction rate is also increased. In yet another embodiment, the polyol feedstock injectors are distributed with decreasing frequency, injecting more polyol feedstock at the beginning of the reactor and less as the reaction increases in temperature. Thus as heat increases along the interior of the hydrotreating reactor, the increased space between injectors decreases the reaction rate maintaining a cooler temperature while still generating more product.

TABLE 3

EFFECT OF DIESEL TO SORBITOL DILUTION RATIO ON REACTOR ΔP

| Diesel/Sorbitol ratio (vol) | Pressure drop across reactor |
|---|---|
| 2 | ΔP was observed after about one week on stream operation at the temperature of 640° F. due to coke formation on catalyst bed |
| 4 | No ΔP was observed after one week on stream operation at 650° F. followed with 10 days operation at 680° F. |

In closing, it should be noted that the discussion of any reference is not an admission that it is prior art to the present invention, especially any reference that may have a publication date after the priority date of this application. At the same time, each and every claim below is hereby incorporated into this detailed description or specification as a additional embodiments of the present invention.

Although the systems and processes described herein have been described in detail, it should be understood that various changes, substitutions, and alterations can be made without departing from the spirit and scope of the invention as defined by the following claims. Those skilled in the art may be able to study the preferred embodiments and identify other ways to practice the invention that are not exactly as described herein. It is the intent of the inventors that variations and equivalents of the invention are within the scope of the claims while the description, abstract and drawings are not to be used to limit the scope of the invention. The invention is specifically intended to be as broad as the claims below and their equivalents.

REFERENCES

All of the references cited herein are expressly incorporated by reference. The discussion of any reference is not an admission that it is prior art to the present invention, especially any reference that may have a publication data after the priority date of this application. Incorporated references are listed again here for convenience:
1. U.S. Pat. Nos. 4,503,278, 4,549,031, "Process for converting carbohydrates to hydrocarbons" Mobil Oil Corporation, Chen and Koenig (1985).
2. U.S. Pat. No. 5,959,167, WO9910450, "Process for conversion of lignin to reformulated hydrocarbon gasoline" The University of Utah Research Foundation (1985).
3. U.S. Pat. No. 7,572,925, US2008033188, US2009124839, WO2008151178, WO2008151178 "Production of Liquid Alkanes in the Jet Fuel Range (C8-C15) from Biomass-Derived Carbohydrates," Wisconsin Alumni Res. Found., Dumesic and Roman-Leshkov, (2007).
4. US2008173570, WO2008087269, Inst Francais du Petrole, Marchand and Bertoncini, (2008)
5. US2009126260, WO2009039015, WO2009039201, "Methods for Refining Hydrocarbon Feedstocks" Sapphire Energy, Inc., Aravanis, et al. (2009).
6. WO2008114033 "BioGasoline" StatoilHydro ASA, Fredriksen and Myrstad (2008).
7. EP2034005, "Fuel additive concentrate derived from a biomass resource" Furanix Tech. B.V, Gruter, (2009).
8. U.S. Ser. No. 61/236,347, "HYDROTREATING CARBOHYDRATES," ConocoPhillips Co., Sughrue and Yao, (2009).
9. David, et al., "A Review of Catalytic Issues and Process Conditions for Renewable Hydrogen and Alkanes by Aqueous-Phase Reforming of Oxygenated Hydrocarbons Over Supported Metal Catalysts," Appl. Catal. B., 56, 171 (2004)
10. Huber, et al., "Renewable Alkanes by Aqueous-Phase Reforming of Biomass-Derived Oxygenates" Angew. Chem. Int. Ed., 43, 1549 (2004)
11. Metzger, "Production of Liquid Hydrocarbons from Biomass," Angew. Chem. Int. Ed., 45, 696 (2006)

The invention claimed is:
1. A method of hydrotreating polyol feedstock that reduces coking, the method comprising:
 a) contacting a hydrotreating catalyst with a diesel feedstock at the beginning of the reactor catalyst,
 b) contacting the hydrotreating catalyst with a polyol feedstock at the beginning of the reactor catalyst,
 c) contacting the hydrotreating catalyst with one or more additional polyol feedstocks at intervals along the reactor catalyst,
 wherein said polyol feedstock is reacted on said catalyst to generate alkanes.
2. The method of claim 1, wherein said fuel oil feedstock is heated to reaction temperature prior to contacting the hydrotreating catalyst.
3. The method of claim 1, wherein said polyol feedstock comprises Glycol, Glycerol, Erythritol, Threitol, Arabitol,

Ribitol, Xylitol, Allitol, Dulcitol, Galactitol, Iditol, Mannitol, Sorbitol, Isomalt, Lactitol, Maltitol, Trehalose, and combinations thereof.

4. The process of claim 1, wherein said fuel oil feedstock is selected from the group consisting of gasoline, jet fuel, kerosene, heating oil, fuel oils, diesel fuel, petro-diesel, bio-diesel, synthetic diesel, blended diesel, and combinations thereof.

5. The process of claim 1, wherein said hydrotreating catalyst is selected from the group consisting of cobalt (Co), molybdenum (Mo), nickel (Ni), titanium (Ti), tungsten (W), zinc (Zn), antimony (Sb), bismuth (Bi), cerium (Ce), vanadium (V), niobium (Nb), tantalum (Ta), chromium (Cr), manganese (Mn), rhenium (Re), iron (Fe), platinum (Pt), iridium (Ir), palladium (Pd), osmium (Os), rhodium (Rh), ruthenium (Ru), and combinations thereof.

6. The process of claim 1, wherein said hydrotreating catalyst is a bimetallic catalyst selected from the group consisting of Co/Mo, Co/W, Ni/Mo, Ni/W, Ti/Mo, Ti/W and combinations thereof.

7. The process of claim 1, wherein said reaction occurs at an approximate temperature of 400° F., 425° F., 450° F., 475° F., 500° F., 525° F., 550° F., 575° F., 600° F., 625° F., 650° F., 675° F., 700° F., 725° F., 750° F., 775° F., 800° F., 825° F., 850° F., 875° F., or 900° F.

8. The process of claim 1, wherein said reaction occurs at an approximate pressure of 500, 550, 600, 650, 700, 750, 800, 850, 900, 950, 1000, 1050, 1100, 1150, 1200, 1250, 1500, 1750, 2000, 2250, 2500, 2750, and 3000 psig.

9. The process of claim 1, wherein said hydrotreating catalyst is an unsupported catalyst selected from the group consisting of Co/Mo, Co/W, Ni/Mo, Ni/W, Ti/Mo, Ti/W, Co/Mo/W, Ni/Mo/W, Ti/Mo/W and combinations thereof.

10. A method of hydrotreating liquefied biomass feedstock that reduces coking, the method comprising:
 a) liquifying biomass to generate a polyol feedstock,
 b) contacting a hydrotreating catalyst with a fuel oil feedstock at the beginning of the reactor catalyst,
 c) contacting the hydrotreating catalyst with the polyol feedstock at the beginning of the reactor catalyst,
 d) contacting the hydrotreating catalyst with one or more additional polyol feedstocks at intervals along the reactor catalyst,
 wherein said polyol feedstock is reacted on said catalyst to generate alkanes.

11. The method of claim 10, wherein said fuel oil feedstock is heated to reaction temperature prior to contacting the hydrotreating catalyst.

12. The method of claim 10, wherein said polyol feedstock comprises Glycol, Glycerol, Erythritol, Threitol, Arabitol, Ribitol, Xylitol, Allitol, Dulcitol, Galactitol, Iditol, Mannitol, Sorbitol, Isomalt, Lactitol, Maltitol, Trehalose, and combinations thereof.

13. The process of claim 10, wherein said fuel oil feedstock is selected from the group consisting of gasoline, jet fuel, kerosene, heating oil, fuel oils, diesel fuel, petro-diesel, bio-diesel, synthetic diesel, blended diesel, and combinations thereof.

14. The process of claim 10, wherein said hydrotreating catalyst is selected from the group consisting of cobalt (Co), molybdenum (Mo), nickel (Ni), titanium (Ti), tungsten (W), zinc (Zn), antimony (Sb), bismuth (Bi), cerium (Ce), vanadium (V), niobium (Nb), tantalum (Ta), chromium (Cr), manganese (Mn), rhenium (Re), iron (Fe), platinum (Pt), iridium (Ir), palladium (Pd), osmium (Os), rhodium (Rh), ruthenium (Ru), and combinations thereof.

15. The process of claim 10, wherein said hydrotreating catalyst is a bimetallic catalyst selected from the group consisting of Co/Mo, Co/W, Ni/Mo, Ni/W, Ti/Mo, Ti/W and combinations thereof.

16. The process of claim 10, wherein said reaction occurs at an approximate temperature of 400° F., 425° F., 450° F., 475° F., 500° F., 525° F., 550° F., 575° F., 600° F., 625° F., 650° F., 675° F., 700° F., 725° F., 750° F., 775° F., 800° F., 825° F., 850° F., 875° F., or 900° F.

17. The process of claim 10, wherein said reaction occurs at an approximate pressure of 500, 550, 600, 650, 700, 750, 800, 850, 900, 950, 1000, 1050, 1100, 1150, 1200, 1250, 1500, 1750, 2000, 2250, 2500, 2750, and 3000 psig.

18. The process of claim 10, wherein said hydrotreating catalyst is an unsupported catalyst selected from the group consisting of Co/Mo, Co/W, Ni/Mo, Ni/W, Ti/Mo, Ti/W, Co/Mo/W, Ni/Mo/W, Ti/Mo/W and combinations thereof.

* * * * *